United States Patent
Alves et al.

(10) Patent No.: US 9,228,250 B2
(45) Date of Patent: Jan. 5, 2016

(54) NI—FE—CR—MO ALLOY

(75) Inventors: Helena Alves, Dortmund (DE); Rainer Behrens, Iserlohn (DE)

(73) Assignee: VDM Metals GmbH, Werdohl (DE)

( * ) Notice: Subject to any disclaimer, the term of this patent is extended or adjusted under 35 U.S.C. 154(b) by 169 days.

(21) Appl. No.: 13/881,851

(22) PCT Filed: Oct. 20, 2011

(86) PCT No.: PCT/DE2011/001875
§ 371 (c)(1),
(2), (4) Date: May 29, 2013

(87) PCT Pub. No.: WO2012/059080
PCT Pub. Date: May 10, 2012

(65) Prior Publication Data
US 2013/0259739 A1  Oct. 3, 2013

(30) Foreign Application Priority Data

Oct. 29, 2010 (DE) .......................... 10 2010 049 781

(51) Int. Cl.
| | |
|---|---|
| *C22C 19/05* | (2006.01) |
| *C22C 30/02* | (2006.01) |
| *B23K 35/02* | (2006.01) |
| *B23K 35/30* | (2006.01) |
| *B32B 15/01* | (2006.01) |
| *C22C 30/00* | (2006.01) |
| *C22C 38/08* | (2006.01) |
| *C22C 38/44* | (2006.01) |
| *C22F 1/10* | (2006.01) |
| *F16L 9/02* | (2006.01) |
| *C22C 38/00* | (2006.01) |
| *C22C 38/02* | (2006.01) |
| *C22C 38/06* | (2006.01) |
| *C22C 38/42* | (2006.01) |
| *C22C 38/54* | (2006.01) |
| *C22C 38/58* | (2006.01) |

(52) U.S. Cl.
CPC ........... *C22C 19/055* (2013.01); *B23K 35/0261* (2013.01); *B23K 35/304* (2013.01); *B32B 15/01* (2013.01); *C22C 30/00* (2013.01); *C22C 30/02* (2013.01); *C22C 38/001* (2013.01); *C22C 38/004* (2013.01); *C22C 38/005* (2013.01); *C22C 38/02* (2013.01); *C22C 38/06* (2013.01); *C22C 38/08* (2013.01); *C22C 38/42* (2013.01); *C22C 38/44* (2013.01); *C22C 38/54* (2013.01); *C22C 38/58* (2013.01); *C22F 1/10* (2013.01); *F16L 9/02* (2013.01)

(58) Field of Classification Search
CPC ...... C22C 19/055; C22C 38/42; C22C 38/58; C22C 30/00; C22C 38/08; C22C 38/44; C22C 30/02; C22C 38/001; C22C 38/004; C22C 38/005; C22C 38/02; C22C 38/06; C22C 38/54; B23K 35/0261; B23K 35/304; B32B 15/01; C22F 1/10; F16L 9/02
See application file for complete search history.

(56) References Cited

U.S. PATENT DOCUMENTS

| | | | |
|---|---|---|---|
| 4,400,210 A | 8/1983 | Kudo et al. | |
| 4,400,211 A | 8/1983 | Kudo et al. | |
| 4,400,349 A | 8/1983 | Kudo et al. | |
| 4,421,571 A | 12/1983 | Kudo et al. | |
| 4,824,638 A | 4/1989 | Culling | |
| 4,876,065 A | 10/1989 | Rockel et al. | |
| 5,841,046 A | 11/1998 | Rhodes et al. | |
| 7,081,173 B2 | 7/2006 | Bahar et al. | |
| 2005/0016636 A1 | 1/2005 | Kobayashi et al. | |
| 2007/0175547 A1* | 8/2007 | Igarashi et al. | ............... 148/442 |
| 2010/0102910 A1 | 4/2010 | Waeckerle et al. | |
| 2012/0034484 A1 | 2/2012 | Behrens | |

FOREIGN PATENT DOCUMENTS

| | | |
|---|---|---|
| CN | 101275208 A | 10/2008 |
| CN | 101680070 A | 3/2010 |
| DE | 32 23 457 | 1/1983 |
| DE | 10 2009 022 203 | 3/2011 |
| EP | 0 292 061 | 11/1988 |
| EP | 1 717 330 | 11/2006 |
| JP | S64-25936 A | 1/1989 |
| JP | H01-111841 A | 4/1989 |
| JP | 2005-509751 A | 4/2005 |
| JP | 2012-527391 A | 11/2012 |
| KR | 20060122245 A | 11/2006 |
| WO | WO 2010/133197 | 11/2010 |

OTHER PUBLICATIONS

International Search Report of PCT/DE2011/001875, May 4, 2012.
English translation of International Preliminary Report on Patentability of PCT/DE2011/001875, May 2, 2013.
VdTÜV Material Sheet 509/1, Dec. 2009 version, EN Material No. 1.4562, total of 5 pages (With English Translation) (Spec, pp. 1, 3, 6, 8-9 and 11).
Diss. ETH Zürich Publication No. 10647 (1994), total of 4 pages (With English Abstract) (Spec, pp. 4 and 7).

* cited by examiner

Primary Examiner — Jesse Roe
(74) Attorney, Agent, or Firm — Collard & Roe, P.C.

(57) ABSTRACT

The invention relates to an alloy comprising (in mass %) Ni 33-35%, Cr 26-28%, Mo 6-7%, Cu 0.5-1.5%, Mn 1.0-4%, Si max. 0.1%, Al 0.01-0.3%, C max. 0.01%, N 0.1-0.25%, B 0.001-0.004%, SE>0 to 1%, and Fe remainder, including unavoidable impurities.

7 Claims, 1 Drawing Sheet

Laboratory batch LB 2151 (according to the invention)

NI—FE—CR—MO ALLOY

CROSS REFERENCE TO RELATED APPLICATIONS

This application is the National Stage of PCT/DE2011/001875 filed on Oct. 20, 2011, which claims priority under 35 U.S.C. §119 of German Application No. 10 2010 049 781.9 filed on Oct. 29, 2010, the disclosures of which are incorporated by reference. The international application under PCT article 21(2) was not published in English.

BACKGROUND OF THE INVENTION

1. Field of the Invention

The invention relates to an Ni—Fe—Cr—Mo alloy, especially a modified alloy in accordance with EN Material No. 1.4562 as well as its use.

2. The Prior Art

The alloy with Material No. 1.4562 has on the average the following chemical composition (standard values in mass %) Ni 31%, Mn 1.7%, Cr 27%, Mo 6.5%, Cu 1.3%, N 0.2%.

DE 32 23 457 A1 relates to an alloy, especially for the manufacture of highly loadable pipework of deep boreholes or the like with elevated resistance to stress corrosion cracking, consisting of C≤0.1%, Mn 3-20%, S≤0.005%, Al≤0.5%, Cr 22.5-35%, W 0-8%, Si≤1%, P≤0.03%, N 0-0.3%, Ni 25-60%, Mo 0-4%, Cu 0-2%, RE 0-0.1%, Mg 0-0.1%, Ca 0-0.1%, Co 0-2%, Y 0-0.2%, Ti 0-0.5%, wherein Cr (%)+10Mo (%)+5W (%)≥50%

½Mn (%)+Ni (%)≥35(%)

1.5%≤Mo (%)+½W (%)<4.

From U.S. Pat. No. 5,841,046, a high-strength corrosion-resistant austenitic non-rusting steel, which contains an effect total (PREN)>55, can be inferred. An alloy of the following composition (in mass %) is presented: max. 0.08% C, 0.5-12.5% Mn, 20-29% Cr, 17-35% Ni, 3-10% Mo, >0.7% N, up to 1.0% Si, up to 0.02% B, up to 0.02% Mg, up to 0.05% Ce, remainder iron. For chromium contents between 24 and 28%, the nickel contents are indicated as between 21 and 23%, wherein the effect total (PREN) ranges between 49 and 65. In this state of the art, the extremely high nitrogen content is of significance.

In U.S. Pat. No. 4,824,638, a corrosion-resistant alloy of the following chemical composition (in mass %) is described: 20.5-32% nickel, 23.5 to 27.5% chromium, 4 to 6.7% molybdenum, 0.7 to 3.6% copper, up to 0.09% carbon, up to 1.5% silicon, up to 5% cobalt, up to 0.45% nitrogen, up to 1% titanium, up to 0.8% niobium, up to 0.3% rare earths (Ce, La, mixed metal), up to 2% manganese, up to 1.6% tantalum, remainder iron, wherein the sum of the nickel and cobalt contents is between 25.5 and 32% and the chromium content is exceeded by 2 to 6.2%.

From EP 0 292 061 A1, an alloy has become known with (in mass %) 30-32Ni, 26-28Cr, 0.5-1.5% Cu, max. 2% Mn, max. 1% Si, max. 0.2% Al, max. 0.02% C, remainder Fe, including unavoidable admixtures, which furthermore also contain 6-7% Mo and 0.1-0.25% N.

The alloy in accordance with EP 0 292 061 A1 was developed in order to be able to make available a material that is suitable for the manufacture of structural parts that must have a good corrosion resistance, especially to pitting corrosion and/or stress corrosion cracking, in aqueous, neutral or acid media with high chloride ion concentration. It is also intended to be usable for the manufacture of structural parts that must have an erosion rate of less than 0.20 mm/year in technical phosphoric acid with a chloride ion concentration up to 1000 ppm at 100° C. At the same time, it should be suitable for the manufacture of structural parts that must have a pitting corrosion potential of at least 1000 mV$_H$ at 75° C. and of at least 800 mV$_H$ at 90° C. in aqueous neutral media with a chloride ion concentration on the order of magnitude of 20,000 ppm. It should further be suitable as material for the manufacture of structural parts that must have a critical pitting corrosion temperature of at least 80° C. and a critical stress corrosion cracking temperature of at least 50° C. in acid media with a chloride ion concentration of 50,000 ppm and higher, such as, e.g. in an FeCl$_3$ solution.

Consequently, this alloy used heretofore has in practice more than satisfied the expectations placed on it. However, the very high solution annealing temperature for dissolution of the brittle sigma phase, which according to VdTÜV Material Sheet 509/1, December 2009 version, must lie at 1150 to 1180° C., together with the additional criterion of a subsequent rapid cooling by means of quenching in water or by means of compressed air (depending on the wall thickness), in such a way that the temperature range down to 650° C. is rapidly transited, has been found to be disadvantageous for this alloy. For the assurance of a flawless dissolution of the sigma phase even for thicker-walled structural parts, at least the upper temperature of 1180° C. must be used in the industrial practice. Cases are now known in which such a solution annealing treatment must be integrated into the manufacturing process, for example in the hot cladding of large sheet sizes in the sandwich package or in the hot pressing of thick-walled vessel bottoms. In this connection, it has been found that the solution annealing and cooling conditions mentioned in the foregoing then cannot be satisfied to the extent that the high pitting corrosion and stress corrosion cracking temperatures expected for this alloy are now not attained because of the separation of sigma phase.

For alloys (UNS 32654/654 SMO) with similar contents of chromium 24-26% and molybdenum 7-8%, the following empirical formula for the dependence of the sigma solvus temperature on the alloying components is found in the literature (Rechsteiner ETH Zurich Publ. No.: 10647):

T sigma-solvus=24.6Cr+6.7Mn+50.9Mo+92.2Si−9.2Ni−17.9Cu−230.4C−238.4N+447 (element units: mass percent).

Accordingly, the elements chromium, molybdenum, silicon and manganese raise the sigma solvus temperature; the elements nickel, copper and especially nitrogen act to lower the sigma solvus temperature.

SUMMARY OF THE INVENTION

The task of the invention is to provide an alloy that satisfies the technical requirements described in the foregoing without relinquishing the advantages of the previous alloy.

This task is accomplished by an alloy with (in mass %)

| | |
|---|---:|
| Ni | 33-35% |
| Cr | 26-28% |
| Mo | 6-7% |
| Cu | 0.5-1.5% |
| Mn | 1.0-4% |
| Si | max. 0.1% |
| Al | 0.01-0.3% |
| C | max. 0.01% |
| N | 0.1-0.25% |

| | |
|---|---|
| B | 0.001-0.004% |
| RE | >0 to 1% |

Fe remainder, including unavoidable impurities.

Advantageous improvements of the alloy according to the invention can be inferred from the associated dependent claims.

Surprisingly, it has been found that the high solution annealing temperature range of 1150 to 1180° C. or higher mentioned initially can be significantly lowered when the nickel content of this alloy is increased to 33.0 to 35.0 mass %. For an average nickel content of 34 mass % in comparison with previously 31 mass %, the solution annealing temperature range can be lowered by at least 30° C. to at least 1120 to 1150° C. Furthermore, it has been found that an increase of the manganese content by increase of the solubility of nitrogen acts positively on the metallurgical stability. Both manganese and also nitrogen itself act as stabilizers of the austenitic microstructure. In addition, manganese binds sulfur which impairs the hot workability of the material. Usually, the Material 1.4562 is manufactured with a manganese content of approximately 1.7 mass % on the average. It has now been found that an increase of the manganese content to 1.8 to 2.6 mass % in combination with an alloying of nitrogen facilitates the solution annealing treatment by the additional austenite stabilization, in that the necessary temperature can still be somewhat further lowered and the necessary time shortened. However, too high manganese contents impair the corrosion resistance, which is apparent, for example, during the measurement in the "Green Death" test solution.

It is therefore not obvious to increase the manganese content. Actually, in the laboratory smeltings performed for manganese, it was possible by metallographic examinations to find the raising effect on the sigma solvus temperature, but this apparent disadvantage is eliminated by improvement of the nitrogen solubility in the alloy matrix. According to Rechsteiner ETH Zurich, this nitrogen lowers T sigma-solvus and is available for the increase of the corrosion resistance to pitting corrosion in chloride-containing media according to the PREN formula as follows.

PREN: $Cr+3.3Mo+30N$

The nitrogen solubility increased by the manganese addition defined according to the invention leads to a weaker binding of the nitrogen to chromium as a metal nitride. Hereby the effective content of chromium $Cr_{eff}$, which is available for the increase of the corrosion resistance, is increased.

$Cr_{eff}=Cr-10Cr\,(C+N)$

The effect total PREN (=mass % Cr+3.3 mass % Mo+30 mass % N) from the weighted contents of chromium, molybdenum and nitrogen should lie above a value of 50 on the average for the new alloy just as for the Alloy 1.4562. The structural parts manufactured from it should, under the conditions according to ASTM G 28, Practice A, be resistant to intergranular corrosion and in the solution-annealed condition should have an erosion rate of less than 0.5 mm/year. Finally, it should also be suitable for the manufacture of structural parts that must be free of stress corrosion cracking and pitting corrosion under the conditions of an aggressive proof test with sour gas.

A further feature according to the invention of the modified alloy consists in the use of rare earths (RE), preferably cerium mixed metal. If these are added in the intended scope, they contribute, by the further binding of sulfur in addition to the effectiveness of manganese, to a good processability, especially during hot forming. The contents of RE, especially cerium mixed metal, lie between 0.001 and 0.1%. The preferred range is set at approximately 0.06%.

Cerium mixed metal contains not only cerium but also lanthanum, neodymium, praseodymium, samarium, terbium and yttrium as well as traces of other rare earth metals.

For the improvement of the processability, especially for the hot forming, it is proposed, starting from a diversely usable nickel-iron-chromium-molybdenum alloy (EN Material No. 1.4562), to optimize the nickel content and the manganese content. In this way, the solution annealing temperature of the sigma phase can be significantly lowered, without diminishing the resistance of the alloy to technical phosphoric acid and other technical acids as well as to pitting corrosion and stress corrosion cracking.

DETAILED DESCRIPTION OF THE PREFERRED EMBODIMENTS

Figure 1:
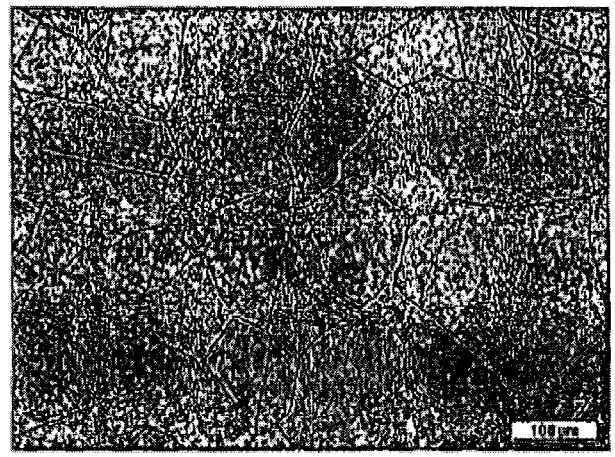
FIG. 1 shows a view of the microstructure of an example of the alloy according to the invention.
Figure 2:
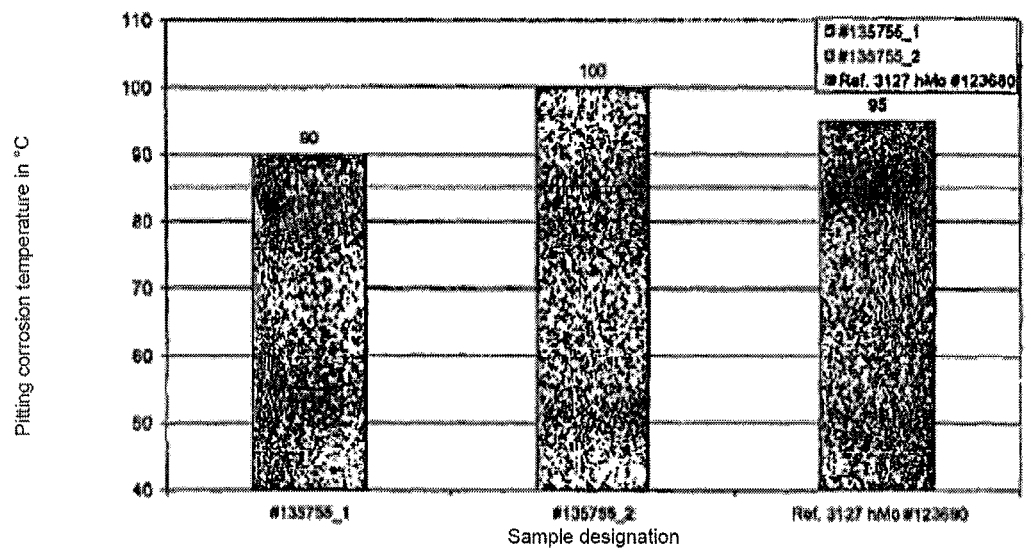
FIG. 2 shows Pitting Corrosion Temperatures of various alloy samples as obtained at ASTM G 48-C conditions.

Preferred cases of application of the alloy according to the invention are cited in the following:

as material for the manufacture of structural parts that must have a good corrosion resistance, especially to pitting corrosion and/or stress corrosion cracking, in aqueous neutral or acid media with high chloride ion concentration;

as material for the manufacture of structural parts that must have an erosion rate of less than 0.20 mm/year in technical phosphoric acid with a chloride ion concentration up to 1000 ppm at 100° C.;

as material for the manufacture of structural parts that must have a pitting corrosion potential of at least 1000 $mV_H$ at 75° C. and of at least 800 $mV_H$ at 90° C. in aqueous neutral media with a chloride ion concentration on the order of magnitude of 45,000 ppm;

as material for the manufacture of structural parts that must have a critical pitting corrosion temperature of at least 80° C. and a critical stress corrosion cracking temperature of at least 50° C. in acid media with a chloride ion concentration of 50,000 ppm and higher, such as, e.g. in an $FeCl_3$ solution;

as material for the manufacture of structural parts that, under the conditions according to ASTM G 28, Practice A, are resistant to intergranular corrosion and in the solution-annealed condition have an erosion rate of less than 0.5 mm/year;

as material for the manufacture of structural parts that are free of stress corrosion cracking and pitting corrosion under the conditions of a proof test with sour gas.

The alloy according to the invention can preferably be used for the production of strips, sheets, bars and forged parts, pipes and wires, likewise as welding rods.

Roll-clad or explosive-clad structural parts that heretofore were only difficult to manufacture with the alloy according to Material No. 1.4562 because of the high solution annealing temperature can now be manufactured more easily due to the lowered solution annealing temperature.

Table 1 discloses exemplary examples of the alloy according to the invention, smelted in the laboratory (LB 2151), of a large industrial heat (Nicrofer 3426 hMo) and of an alloy to be attributed to the state of the art (LB 2149), especially their chemical compositions and test results.

TABLE 1

|    | LB 2149 (values in %) | LB 2151 (values in %) | Nicrofer 3426 hMo (135755) |
|----|----|----|----|
| Ni | 31.78 | 33.84 | 33.79 |
| Fe | 30.8 (R) | 29.52 (R) | 29.16 (R) |
| Cr | 27.93 | 26.74 | 26.38 |
| Mo | 6.16 | 6.67 | 6.88 |
| Cu | 1.13 | 1.27 | 1.16 |
| Mn | 1.54 | 1.54 | 1.97 |
| Si | 0.04 | 0.04 | 0.05 |
| Al | 0.15 | 0.04 | 0.04 |
| N  | 0.18 | 0.194 | 0.21 |
| C  | 0.022 | 0.0024 | 0.007 |
| S  | 0.0046 | 0.0015 | 0.002 |
| B  | 0.003 | 0.004 | 0.003 |
| RE | 0.07 | 0.02 | 0.02 |
| Co |  |  | 0.14 |

The laboratory batch LB 2149 has an Ni content outside the claimed Ni range.

Metallography:

The microstructure is free of sigma phase and completely recrystallized.

Mechanical Values of 22 mm Sheet:
Tension Test at Room Temperature:
Transverse Specimens

| 22 mm sheet Nicrofer 3426hMo #135755 | Yield strength $Rp_{0.2}$ N/mm$^2$ | Yield strength $Rp_{1.0}$ N/mm$^2$ | Tensile strength Rm | Reduction of area at break $A_{man}$% |
|---|---|---|---|---|
|  | 330 | 371 | 708 | 59 |

Hardness Measurement
HRB 84
Notch Impact:
Transverse Specimens
262 joule (Av)

Corrosion Measurements of Critical Pitting Corrosion Temperature in the "Green Death":

The investigations of the critical pitting corrosion temperature in the Green Death test medium showed that the target temperature of 55° C. was exceeded.

The calculated effective PREN from the chromium, molybdenum and nitrogen lies at PREN=54 for the alloy according to the invention and therefore lies at a numerical value above 50, just as the known Alloy 1.4562.

Critical Pitting Corrosion Temperature According to ASTM G48 C:

In the ASTM G48 C test, samples from the sheet rolled to 22 mm attained a critical pitting corrosion temperature between 90 and 100° C. Samples of the Material 1.4562 from a 5 mm sheet as comparison attained a maximum temperature of 95° C. in this test.

Corrosion Test ASTM G 28, Practice a (Intergranular Corrosion):

A value of 0.19 mm/year was obtained as the result, and no intergranular corrosion was observed in the ground section.

The invention claimed is:

1. A deposit material comprising an alloy with (in mass %)

| Ni | 33.5-35% |
|---|---|
| Cr | 26-28% |
| Mo | 6-7% |
| Cu | 0.5-1.5% |
| Mn | 1.5-2.6% |
| Si | max. 0.1% |
| Al | 0.01-0.3% |
| C | max. 0.01% |
| N | 0.1-0.25% |
| B | 0.001-0.004% |
| cerium mixed metal | 0.001-0.1% |

Fe remainder, including unavoidable impurities, wherein the deposit material is configured to be subjected to a cladding process.

2. The deposit material comprising the alloy according to claim 1, wherein the Ni content (in mass %) is 33.5-34.5%.

3. The deposit material comprising the alloy according to claim 1, wherein the manganese content (in mass %) is 1.5 to 2.0%.

4. The deposit material comprising the alloy according to claim 1, wherein the nitrogen content (in mass %) is 0.14 to 0.22%.

5. The deposit material comprising the alloy according to claim 1, wherein the grand total of the cerium mixed metal is max. 0.06%.

6. The deposit material comprising the alloy according to claim 1, wherein the effect total PREN (=mass % Cr+3.3 mass % Mo+30 mass % N)≥50.

7. The deposit material according to claim 1, wherein the deposit material is configured to be subjected to a roll or explosive cladding process.

* * * * *